Figure 1:
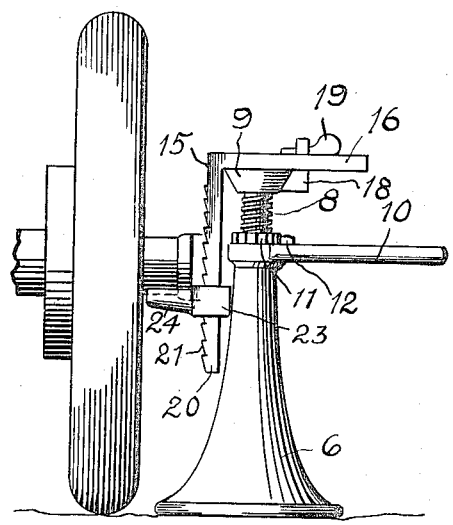

H. KIRIYAMA.
AUTOMOBILE JACK.
APPLICATION FILED APR. 5, 1917.

1,266,958.

Patented May 21, 1918.

INVENTOR
Hisataro Kiriyama

UNITED STATES PATENT OFFICE.

HISATARO KIRIYAMA, OF ELMONTE, CALIFORNIA.

AUTOMOBILE-JACK.

1,266,958.    Specification of Letters Patent.    Patented May 21, 1918.

Application filed April 5, 1917. Serial No. 159,985.

*To all whom it may concern:*

Be it known that I, HISATARO KIRIYAMA, a subject of the Emperor of Japan, residing at Elmonte, in the county of Los Angeles and State of California, have invented a new and useful Improvement in Automobile-Jacks, of which the following is a specification.

This invention relates to a lifting-jack for motor vehicles and particularly automobiles, having for its purposes the provision of improved means for lifting or hoisting upward the wheels thereof when the vehicle is stalled in the mud, whereby boards, planks, and similar articles may be placed beneath the wheels to facilitate traction of the vehicle.

Another object of this invention is to provide a lifting means for automobiles that may be readily applied to the outer hub of the wheels and thereby avoid extreme difficulties that would be experienced in placing the jacks beneath the body of the vehicle when stalled in the mud.

Other objects are to provide means of adjustment to adapt the device to various sizes of wheels and vehicles, and to provide a device for lifting vehicles, with the operative and actuating parts of the device, relatively high from the base thereof, so that its use will not be hindered by the mud.

These and other objects and advantages are attained by the device embodying the principles of this invention, and comprising the combination and arrangement of parts, substantially as herein described and claimed, and illustrated in the drawings forming a part hereof.

Figure 2:
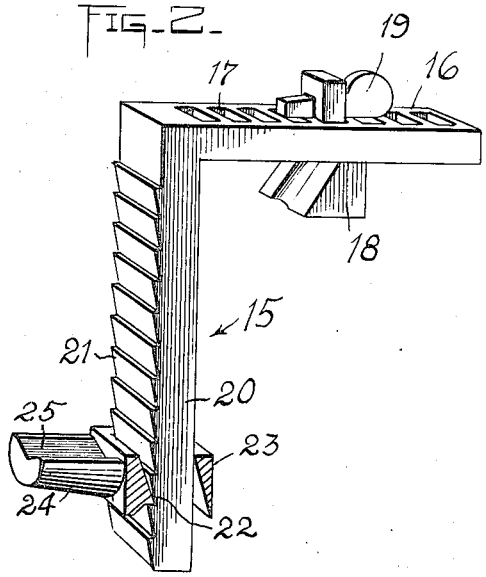
Figure 3:
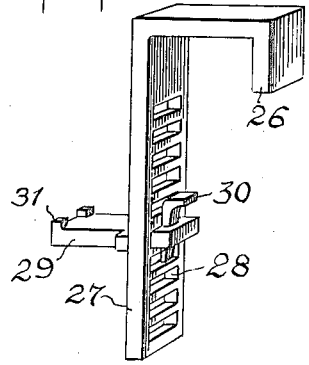
Figure 4:
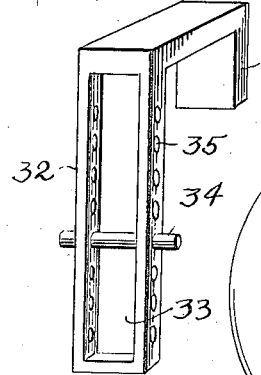
Figure 5:
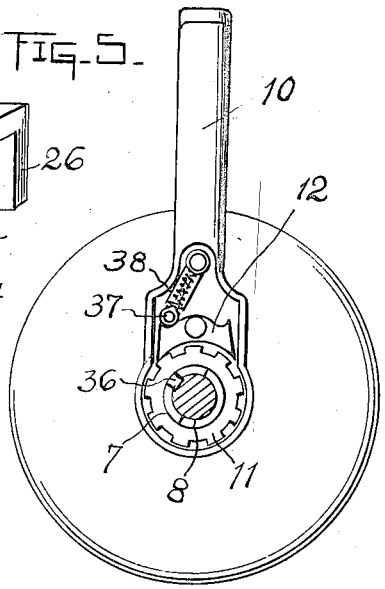
Figure 6:
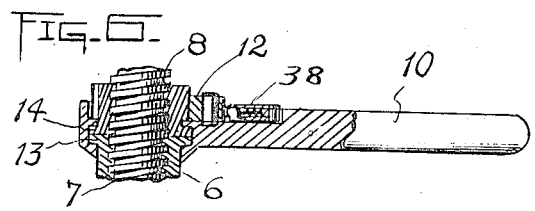

In the drawings: Figure 1 is a side elevation of a lifting-jack embodying my invention, showing the same applied to the wheel hub of a motor vehicle; Fig. 2 is a perspective detail of the hub-engaging member detached; Figs. 3, 4, are modified forms of the hub-engaging members; and Fig. 5 is a plan of the lifting elements on line $X^5$ of Fig. 1. Fig. 6 is a sectional detail of the ratchet.

Referring to the drawings: The lifting elements consist of a base 6, of ample dimensions for insertion in the mud, and formed with a vertically extending threaded opening 7, in which an actuating screw 8 is mounted. A head 9 is rotatably mounted on the upper end of the screw. A handle 10 is rotatably mounted on the upper end of base member 6, and a ratchet 11 is rotatably mounted on the handle, the screw 8 passing through said ratchet and handle. A spring actuated reversible pawl 12 is pivotally connected to the handle, and engages the ratchet. The base is provided at the upper end with a flange 13, and the ratchet at the lower end with a flange 14, which are engaged by the handle. An oscillating movement of the handle will actuate the ratchet, which will in turn cause a vertical movement of the screw.

The hub-engaging member 15, consists of a bar formed in a ninety degree angle, the horizontal leg 16 of which is adapted to rest upon the head 9, and is provided with a series of holes 17 through which the clamping block 18 may be passed. A locking key 19 secures the clamp in various positions along the leg 16, allowing of adjustment for different sizes of heads on the elevating screw.

The vertical leg 20, has a series of projections 21, which are adapted to engage with a corresponding projection 22 within the adjustable bracket 23. The free end 24 of the bracket is adapted to engage with the wheel hub of a motor vehicle, having a concave upper face 25 to retain the hub when elevated.

In Figs. 3, 4, the hub-engaging member has a top formed in a continuous piece, and is retained on the screw head by a depending flange 26. In the form as shown in Fig. 3, the vertical leg 27 is provided with a series of holes 28, through which may be inserted the hub bracket 29, which is retained by the pin 30. Projections 31 retain the hub upon the bracket. In the form shown in Fig. 4, the vertical leg 32 has a slot 33 wide enough to admit various sizes of hubs, and the hubs are supported by a pin 34 inserted in the holes 35 on opposite sides of the slot.

Referring to Fig. 5, the base 6 is provided with a vertical rib 36, engaging a corresponding slot in the elevating screw 8. The reversible pawl 12 is adapted to engage with the ratchet 11 in either direction, being held in engagement therewith by a spring pressed plunger 37 slidably mounted in a pivoted socket 38, the said plunger engaging a depression on either end of the pawl.

It is to be understood that this invention is to be used when the traction of the vehicle is hindered by the mud, or the vehicle is stalled by the poor condition of the roads.

From the foregoing description it will be seen that simple and efficient means are herein provided for accomplishing the objects of the invention, and the elements shown and described are well adapted to serve the purposes for which they are intended, but the invention is not limited to the precise construction as set forth, but includes such changes as may fall within the scope of the appended claims; the invention comprising a lifting jack, and a support adapted to be carried by the head on the elevating screw, the said support having an off-set and adjustable hub engaging bracket provided with retaining means for the hub as shown.

What is claimed is:

A bar for use with lifting means, comprising two legs angularly disposed, and one of which has a longitudinal slot to engage the hub of a vehicle wheel, and the other is formed to engage the lifting means, of a pin extending transversely of said slot, and means for adjusting the pin toward and from the clamping leg engaging the lifting means.

In testimony whereof I hereunto affix my signature this 27th day of March, 1917.

HISATARO KIRIYAMA.

Witnesses:
FLOYD M. HINSHAW,
J. W. MASTER.